US012693065B2

(12) United States Patent (10) Patent No.: US 12,693,065 B2
Yeldos (45) Date of Patent: Jul. 28, 2026

(54) TRIM ASSEMBLY FOR APPLIANCE

(71) Applicant: Fisher & Paykel Appliances Limited, Auckland (NZ)

(72) Inventor: Simon Yeldos, Auckland (NZ)

(73) Assignee: Fisher & Paykel Appliances Limited (NZ)

( * ) Notice: Subject to any disclaimer, the term of this patent is extended or adjusted under 35 U.S.C. 154(b) by 167 days.

(21) Appl. No.: 18/227,585

(22) Filed: Jul. 28, 2023

(65) Prior Publication Data

US 2024/0035732 A1 Feb. 1, 2024

(51) Int. Cl.
| | |
|---|---|
| *F25D 23/02* | (2006.01) |
| *F16B 5/06* | (2006.01) |
| *F25D 23/08* | (2006.01) |
| *F25D 23/10* | (2006.01) |
| *F16B 5/12* | (2006.01) |

(52) U.S. Cl.
CPC ........... *F25D 23/02* (2013.01); *F25D 23/028* (2013.01); *F25D 23/10* (2013.01); *A47B 2210/175* (2013.01); *F16B 5/06* (2013.01); *F16B 5/125* (2013.01); *F25D 23/082* (2013.01); *F25D 23/085* (2013.01); *F25D 2400/18* (2013.01)

(58) Field of Classification Search
CPC ...... F25D 23/10; F25D 23/028; F25D 23/082; F25D 23/085; A47B 2096/208; F24D 2400/18; F16B 5/06; F16B 5/0614; F16B 5/0621; F16B 5/125
See application file for complete search history.

(56) References Cited

U.S. PATENT DOCUMENTS

| | | | | |
|---|---|---|---|---|
| 3,501,186 | A | * | 3/1970 | Trump .................. F16B 5/0621 |
| | | | | 52/800.11 |
| 3,773,399 | A | * | 11/1973 | Sulcek ................. A47B 96/206 |
| | | | | 312/204 |
| 5,358,326 | A | | 10/1994 | Cherry et al. |
| 8,789,900 | B2 | | 7/2014 | Laible et al. |
| 8,876,228 | B2 | | 11/2014 | Laible et al. |
| 12,163,724 | B2 | * | 12/2024 | Hong .................... F25D 23/028 |
| 2009/0251036 | A1 | | 10/2009 | Laible et al. |
| 2010/0283359 | A1 | * | 11/2010 | Hottmann .............. A47B 88/95 |
| | | | | 312/294 |
| 2011/0030410 | A1 | | 2/2011 | Ciyanoglu et al. |

FOREIGN PATENT DOCUMENTS

| | | | | |
|---|---|---|---|---|
| KR | 100869833 | B1 | * | 11/2008 |
| KR | 100869834 | B1 | * | 11/2008 |
| KR | 100888950 | B1 | * | 3/2009 |

* cited by examiner

*Primary Examiner* — Kimberley S Wright
(74) *Attorney, Agent, or Firm* — Clark Hill PLC; James R. Foley

(57) ABSTRACT

A trim assembly for a refrigeration appliance having a door and an outer panel coupled to the door includes one or more bracket and a trim. The bracket(s) is/are adapted to couple the door and outer panel together. Each bracket includes a first plate arranged in a gap between the door and the outer panel and couplable to the inner face of the outer panel, and a second plate disposed substantially perpendicularly to the first plate and couplable to a side face of the door. Each bracket also includes a clip extending out from the second plate. The trim includes a hook structure engageable with the clip of a bracket so that the trim is supported solely by the bracket(s). The trim is configured to cover the bracket(s) and at least some of an opening of the gap between the door and the outer panel.

20 Claims, 9 Drawing Sheets

TRIM ASSEMBLY FOR APPLIANCE

TECHNICAL FIELD

The present disclosure relates, generally, to a home appliance and more particularly relates to a trim assembly for engaging an outer panel to a door or drawer of a home appliance such as a refrigeration appliance, and having a trim that attaches to a bracket coupling the outer panel and the door or drawer.

BACKGROUND INFORMATION

Integrated refrigerators have an outer decorative panel attached to a refrigerator door. The outer decorative panel matches the surrounding kitchen cabinetry, or could, for example, be a stainless steel panel. Brackets are, generally, used to attach the door to the outer decorative panel. The connection between the bracket and the panel and/or between the bracket and the door is adjustable to enable the outer panel's position relative to the surrounding cabinetry to be adjusted to align with the surrounding cabinetry during installation of the product. Once adjusted to a suitable orientation, the panel's location is fixed relative to the door.

There is a gap between the refrigerator's actual door and the outer, decorative panel that is visible when viewed from the lateral side of the door. A trim is ordinarily attached to the door/panel in order to hide that gap. In an existing trim assembly, the trim is a flexible plastics extrusion that is secured to the refrigerator by jamming a leg of the trim, that protrudes from a front face of the trim and extends along the trim's longitudinal length, in a gap between the bracket and the outer panel. As the trim is not securely engaged with the refrigerator, the trim may have a tendency to disengage from the refrigerator, which is undesirable.

It is an object of the present invention to overcome or at least mitigate the above problem.

SUMMARY OF DISCLOSURE

In one aspect the present disclosure relates to a trim assembly for a refrigeration appliance. The refrigeration appliance includes a door and an outer panel coupled to the door. The trim assembly includes a bracket adapted to couple the door and outer panel together. The bracket includes a first plate configured to be positioned in a gap between the door and the outer panel and adapted to be coupled to the inner face of the outer panel, and a second plate disposed substantially perpendicularly to the first plate and adapted to be coupled to a side face of the door. The bracket also includes a clip extending out from the second plate. The trim assembly further includes a trim configured to at least partially cover an opening of the gap between the door and the outer panel. The trim includes a hook structure adapted to engage with the clip of the bracket.

In some additional, alternative, or selectively cumulative embodiments, the clip and the second plate define a space therebetween. A first portion of the hook structure extends inside the space and a second portion of the hook structure rests on a free end of the clip in the attachment of the trim with the bracket.

In some additional, alternative, or selectively cumulative embodiments, the free end of the clip includes a protrusion and the protrusion is adapted to bear against a first side surface of the hook structure.

In some additional, alternative, or selectively cumulative embodiments, the second plate includes a spring extending towards the protrusion and adapted to bear against a second side surface of the hook structure opposite to the first side surface to urge push the hook structure towards the protrusion.

In some additional, alternative, or selectively cumulative embodiments, the spring comprises a plate having a first end connected to the second plate and a free end arranged proximate to the protrusion of the clip. The free end is adapted to bear against the second side surface of the hook structure of the trim.

In some additional, alternative, or selectively cumulative embodiments, the trim includes an elongate cover structure having outer and inner faces and configured to at least partially cover the opening of the gap and having a first longitudinal side and a second longitudinal side at respective lateral edges of the outer and inner faces. The trim further includes a rib extending outwardly from the inner face of the cover structure and arranged between the first and second longitudinal sides. The hook structure of the trim is formed by the rib.

In some additional, alternative, or selectively cumulative embodiments, the rib is a first rib and the trim includes a second rib extending outwardly of the inner face of the cover structure and arranged substantially parallel to the first rib.

In some additional, alternative, or selectively cumulative embodiments, the cover structure includes an overhang portion extending laterally from the first rib to the first longitudinal side. The overhang portion is adapted to at least partially cover the opening of the gap defined between the door and the outer panel.

In some additional, alternative, or selectively cumulative embodiments, the clip is a first clip and the bracket includes a second clip, the second clip extending out from the second plate in a direction opposite to a direction of extension of the first clip.

In some additional, alternative, or selectively cumulative embodiments, plural said brackets are provided for coupling the outer panel to the door, the trim including a respective hook structure for engaging with the clip of each bracket.

In a second aspect, the present disclosure relates to a refrigeration appliance. The refrigeration appliance includes a door having an outer face and a side face arranged substantially perpendicularly to the outer face. The refrigeration appliance also includes an outer panel having an inner face arranged facing the outer face of the door and defining a gap therebetween. Moreover, the refrigeration appliance includes a bracket coupling the outer panel to the door. The bracket includes a first plate arranged in the gap between the outer face of the door and the inner face of the outer panel and coupled to the inner face of the outer panel. The bracket also includes a second plate disposed substantially perpendicularly to the first plate and coupled to the side face of the door. Moreover, the bracket includes a clip extending out from the second plate, wherein the clip extends away from the side face of the door. The refrigeration appliance also includes a trim arranged partially covering an opening of the gap and having a hook structure engaged with the clip of the bracket.

In some additional, alternative, or selectively cumulative embodiments, the clip and the second plate define a space therebetween and a first portion of the hook structure extends inside the space and a second portion of the hook structure rests on a free end of the clip.

In some additional, alternative, or selectively cumulative embodiments, the free end of the clip includes a protrusion that bears against a first side surface of the hook structure.

In some additional, alternative, or selectively cumulative embodiments, the second plate includes a spring extending towards the protrusion and which bears against a second side surface of the hook structure, opposite to the first side surface, to urge the hook structure towards the protrusion.

In some additional, alternative, or selectively cumulative embodiments, the spring comprises a plate having a first end connected to the second plate and a free end arranged proximate to the protrusion of the clip. The free end is adapted to bear against the second side surface of the hook structure of the trim.

In some additional, alternative, or selectively cumulative embodiments the trim includes an elongate cover structure having outer and inner faces and configured to at least partially cover the opening of the gap and having a first longitudinal side and a second longitudinal side at respective lateral edges of the outer and inner faces. The trim also includes a rib extending outwardly from the inner face of the cover structure and arranged between the first and second longitudinal sides. The hook structure of the trim is formed by the rib.

In some additional, alternative, or selectively cumulative embodiments, the rib is a first rib and the trim includes a second rib extending outwardly of the inner face of the cover structure and arranged substantially parallel to the first rib.

In some additional, alternative, or selectively cumulative embodiments, the cover structure includes an overhang portion extending laterally from the first rib to the first longitudinal side, and the overhang portion is adapted to at least partially cover the opening of the gap defined between the door and the outer panel.

In some additional, alternative, or selectively cumulative embodiments, the clip is a first clip and the bracket includes a second clip, the second clip extending out from the second plate, away from the side face of the door, in a direction opposite to a direction of extension of the first clip.

In some additional, alternative, or selectively cumulative embodiments, plural said brackets couple the outer panel to the door, the trim including a respective hook structure for engaging with the clip of each bracket.

In a third aspect, the present disclosure relates to a refrigeration appliance. The refrigeration appliance includes a door having an outer face and a side face arranged substantially perpendicularly to the outer face. The refrigeration appliance also includes an outer panel having an inner face arranged facing the outer face of the door and defining a gap therebetween. Moreover, the refrigeration appliance includes one or more brackets coupling the outer panel to the door, and a trim coupled to the door solely via attachment to at least one of the one or more brackets and extending along the side face of the door. The trim is arranged at least partially covering the gap defined between the door and the outer panel.

In some additional, alternative, or selectively cumulative embodiments, the or each bracket includes a first plate arranged between the door and the outer panel and coupled to the inner face of the outer panel, and a second plate disposed substantially perpendicularly to the first plate and coupled to the side face of the door. The or each bracket also includes a clip extending out from the second plate. The clip extends away from the side face of the door. Moreover, the trim includes a hook structure engaged with the clip of the or each bracket.

In some additional, alternative, or selectively cumulative embodiments, the clip and the second plate define a space therebetween and a first portion of the hook structure extends inside the space and a second portion of the hook structure rests on a free end of the clip.

In some additional, alternative, or selectively cumulative embodiments, the clip includes a protrusion that bears against a first side surface of the hook structure.

In some additional, alternative, or selectively cumulative embodiments, the second plate includes a spring extending towards the protrusion that bears against a second side surface of the hook structure, opposite to the first side surface, to urge the hook structure towards the protrusion.

In some additional, alternative, or selectively cumulative embodiments, the spring comprises a plate having a first end connected to the second plate and a free end arranged proximate to the protrusion of the clip. The free end is adapted to bear against the second side surface of the hook structure of the trim.

In some additional, alternative, or selectively cumulative embodiments the trim includes an elongate cover structure having outer and inner faces and configured to at least partially cover the opening of the gap and having a first longitudinal side and a second longitudinal side at respective lateral edges of the outer and inner faces. The trim also includes a rib extending outwardly from the inner face of the cover structure and arranged between the first and second longitudinal sides. The hook structure of the trim is formed by the rib.

In some additional, alternative, or selectively cumulative embodiments, the rib is a first rib and the trim includes a second rib extending outwardly of the inner face of the cover structure and arranged substantially parallel to the first rib.

In some additional, alternative, or selectively cumulative embodiments, the cover structure includes an overhang portion extending laterally from the first rib to the first longitudinal side, and the overhang portion is adapted to at least partially cover the opening of the gap defined between the door and the outer panel.

Additional aspects and advantages will be apparent from the following detailed description of exemplary embodiments, which will now be described with reference to the accompanying drawings.

DETAILED DESCRIPTION

Figure 1:
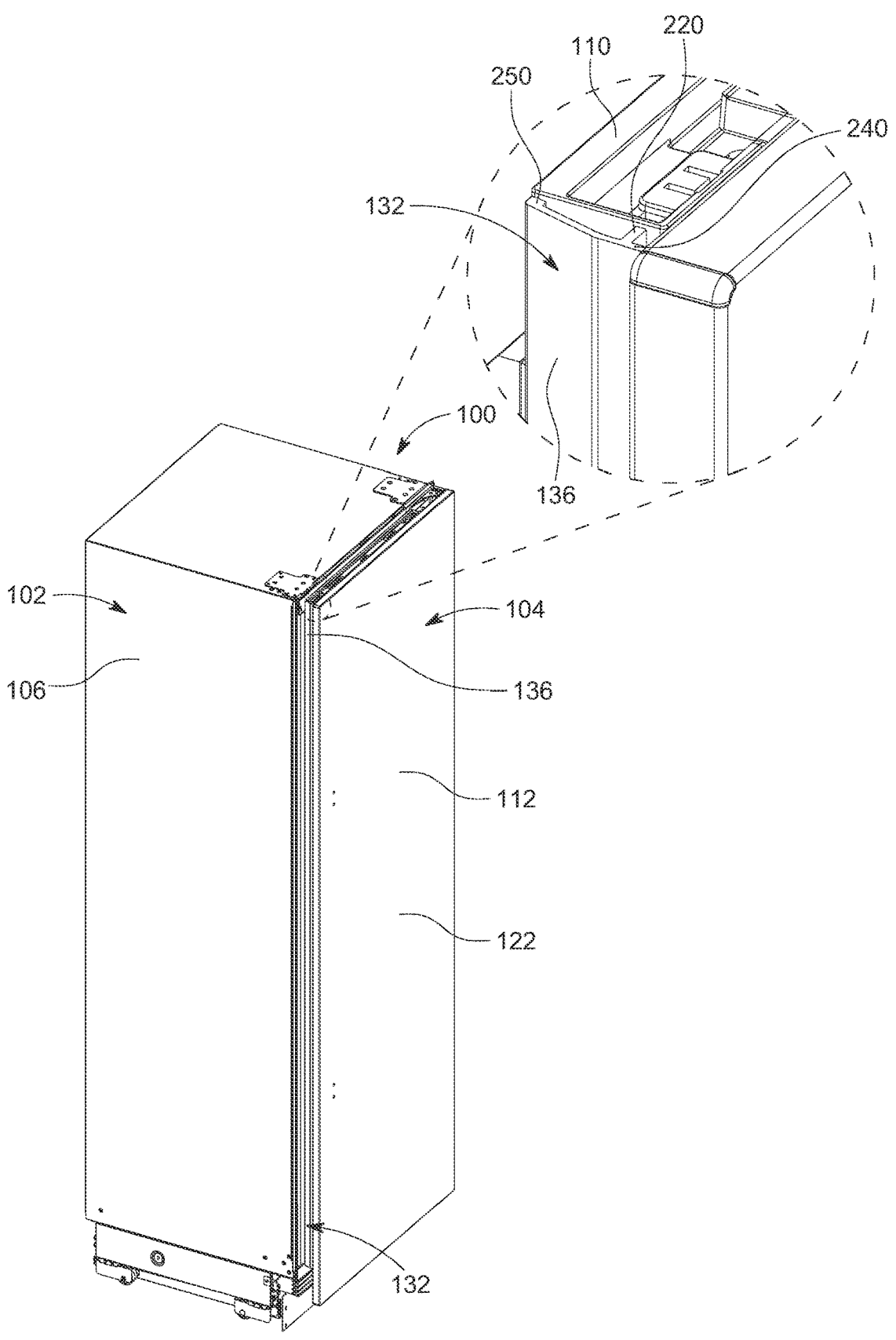
FIG. 1 is a perspective view from the side and front of an exemplary refrigeration appliance having a trim assembly in accordance with an embodiment of the disclosure.

Example embodiments will now be described with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognised that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organisational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right", left", "below", "beneath", "lower", "above", and "upper", and the like, may be used herein for ease of description to describe one element's or feature's relationship to another element or feature, as illustrated in the drawings. It should be recognised that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Figure 2:
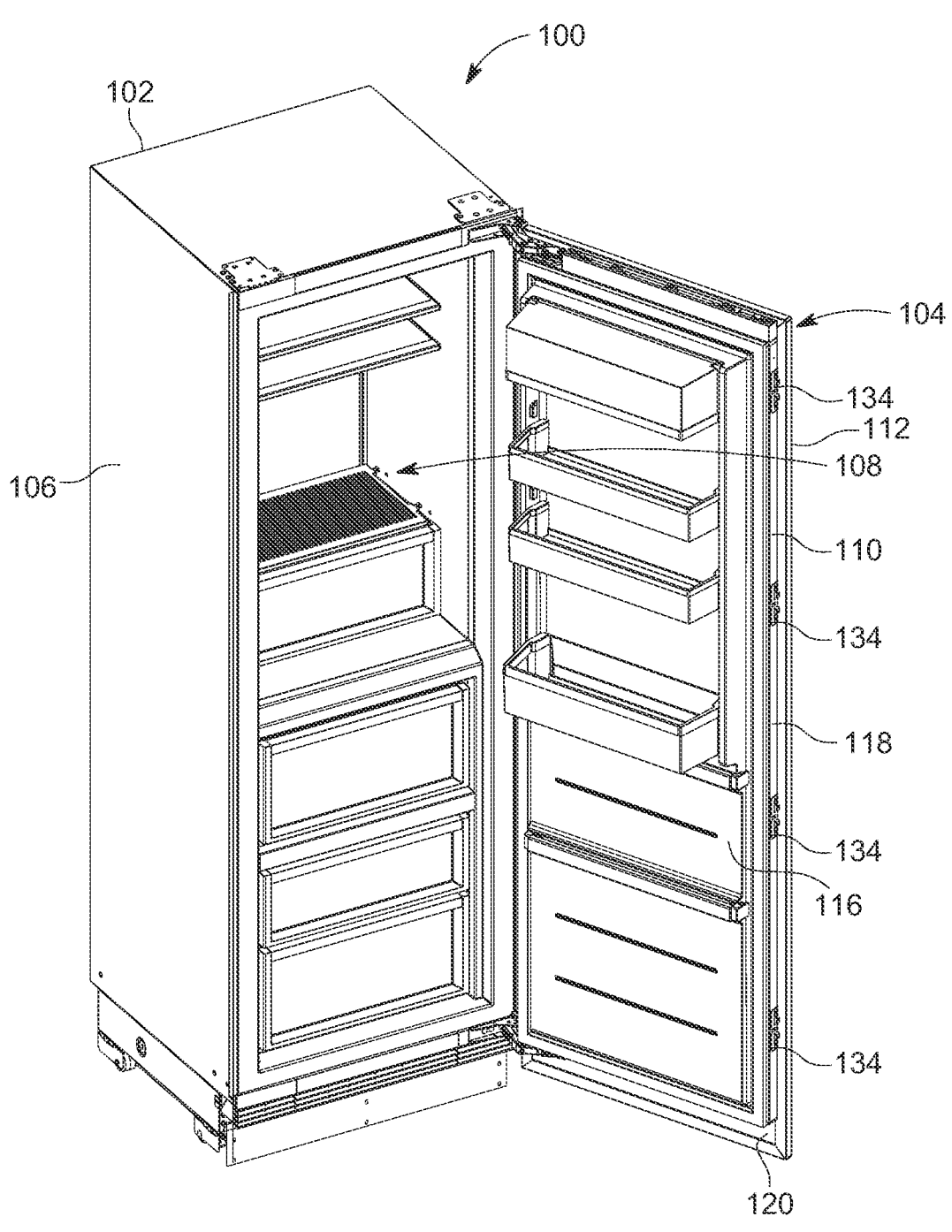
FIG. 2 is a perspective view from the side and front of the refrigeration appliance of FIG. 1 with the door open and a trim of the trim assembly removed to expose brackets of the trim assembly.

Referring to FIGS. 1 and 2, a refrigeration appliance 100, according to an example embodiment, is shown. The refrigeration appliance 100 is shown as a single door "integrated" (or "built-in") refrigerator 102 having a refrigerator door assembly 104 (hereinafter referred to as door assembly 104) pivotally coupled to a refrigerator body 106 via upper and lower hinges and adapted to selectively provide access to a storage chamber 108 of the refrigeration appliance 100. The door assembly 104 includes a door 110 and a decorative outer panel 112 (hereinafter referred to as outer panel 112) attached to an exterior face of the door 110 and arranged with its outer face co-planar with surrounding cabinetry in, for example, a domestic kitchen. Although a single door integrated upright refrigerator is shown and contemplated as the refrigeration appliance 100, it should be appreciated that the refrigeration appliance could be an upright freezer or a combined refrigerator/freezer, and it may have multiple doors, for example, a multiple door refrigeration appliance such as a double-door or "French-door" refrigerator with side-by-side doors or a refrigeration appliance with doors arranged one above the other, or a combination of doors and drawers.

Figure 3:
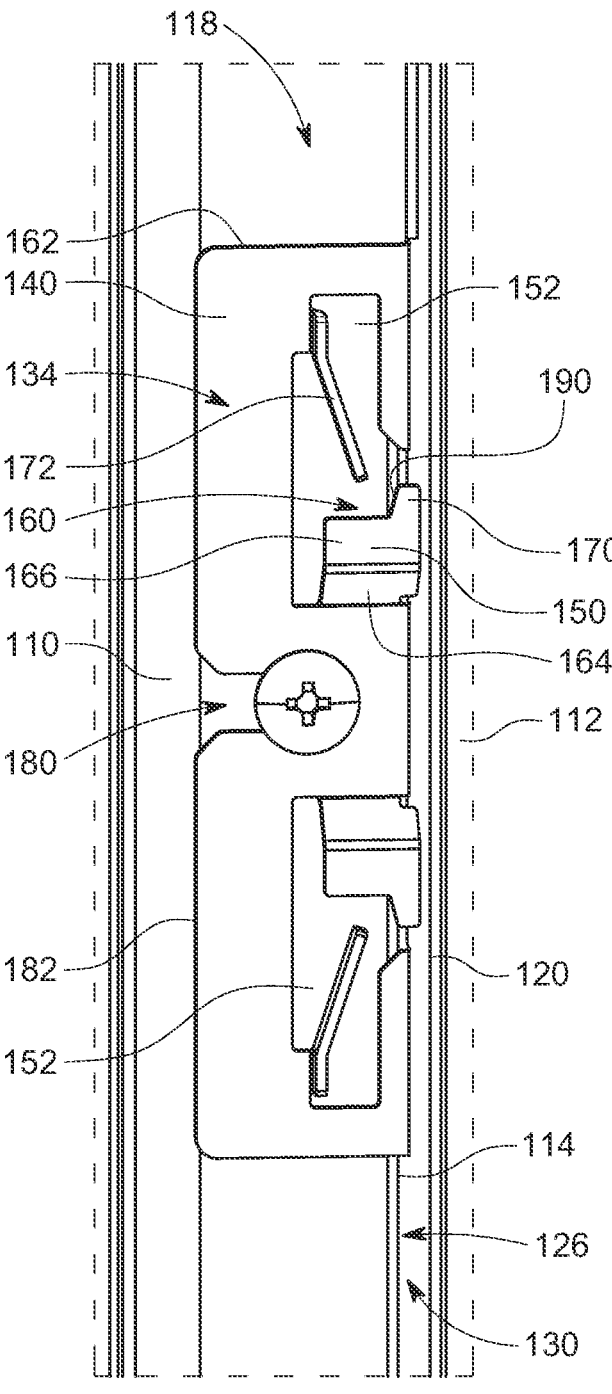
FIG. 3 is an enlarged side view of a portion of the refrigeration appliance with the trim removed to show a bracket and depicting a gap between the appliance door and an outer panel.

As shown, the appliance door 110 includes an outer face 114 (best shown in FIGS. 3, 4 and 8), a storage-chamber-facing surface (i.e., inner face 116) arranged opposite to the outer face 114, and a side face or edge 118 extending between the outer face 114 and the inner face 116 and arranged at a free side of the door 110 (i.e., opposite the door's hinges). As shown, the side face 118 extends substantially perpendicularly to the inner face 116 and the outer face 114 and connects the inner face 116 to the outer face 114. Further, the outer panel 112 incudes a first face 120 (inner face 120) (shown in FIGS. 2 and 3) arranged facing the outer face 114 of the door 110 and a second surface 122 (outer face 122) arranged opposite to the inner face 120. The outer face 122 of the outer panel 112 extends substantially parallel to the outer face 114 of the door 110 and is arranged spaced apart from the outer face 114 of the door 110 such that a gap 126 (shown in FIG. 3) is defined between the inner face 120 of the outer panel 112 and the outer face 114 of the door 110. Further, an opening 130 (shown in FIG. 3) of the gap 126 is defined along the side face 118 of the door. Opening 130 exists at all edges of the door.

Figure 4:
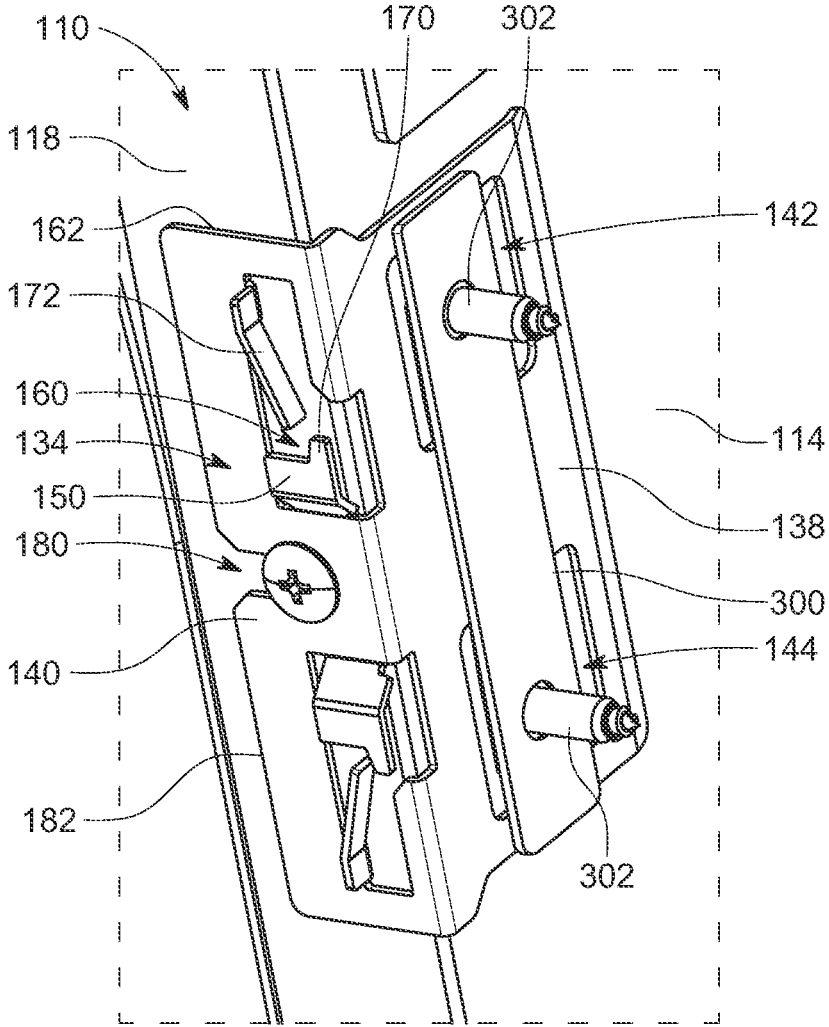
FIG. 4 is an enlarged perspective view from the side and front of a portion of the refrigeration appliance of FIG. 1 with the outer panel removed and depicting engagement of a first plate of the bracket with the door using a spacer plate, in accordance with an embodiment of the disclosure.
Figure 5:
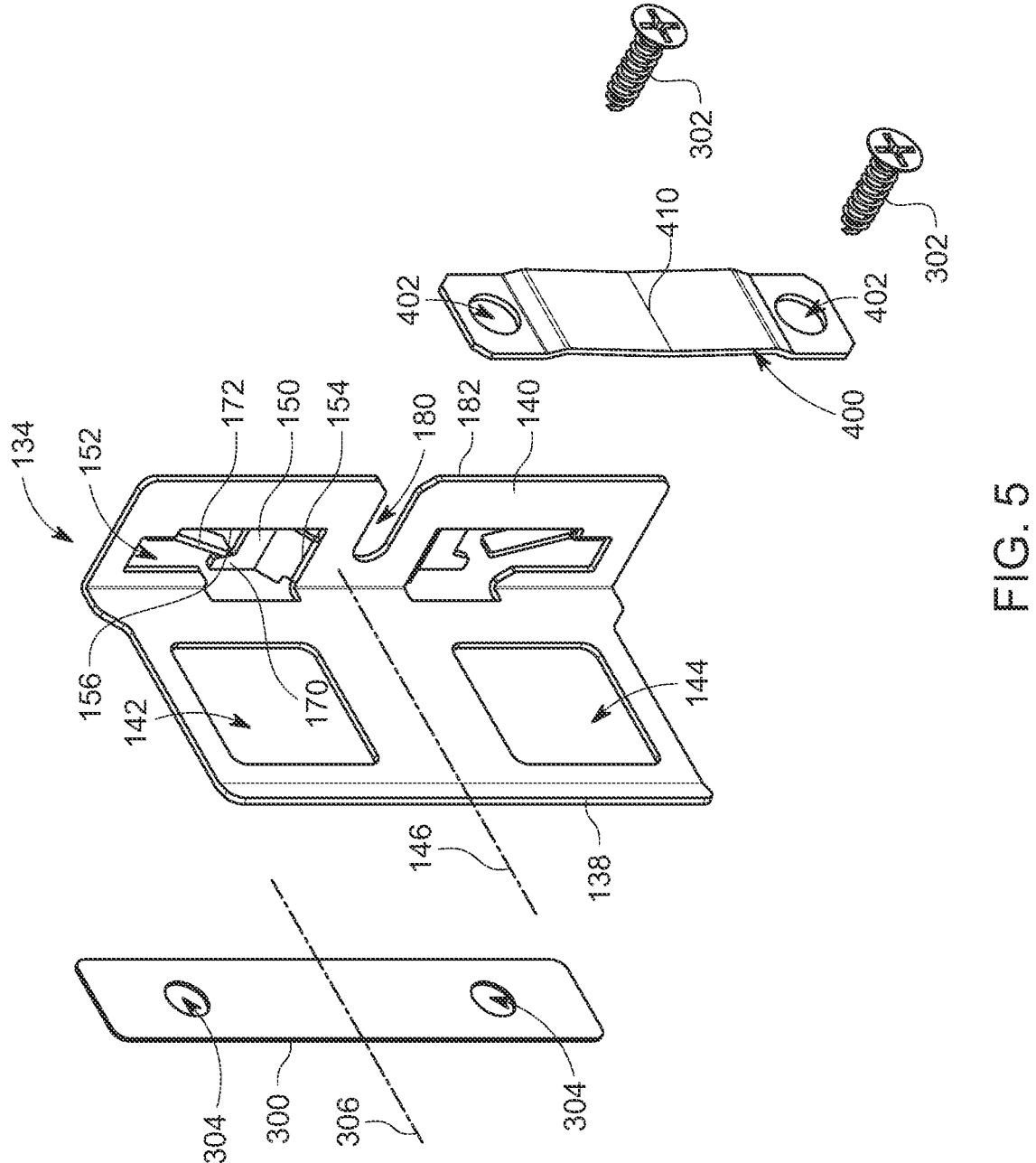
FIG. 5 is an exploded view depicting the bracket of FIG. 4, the spacer plate, and a bridge plate, in accordance with an embodiment of the disclosure.
Figure 6:
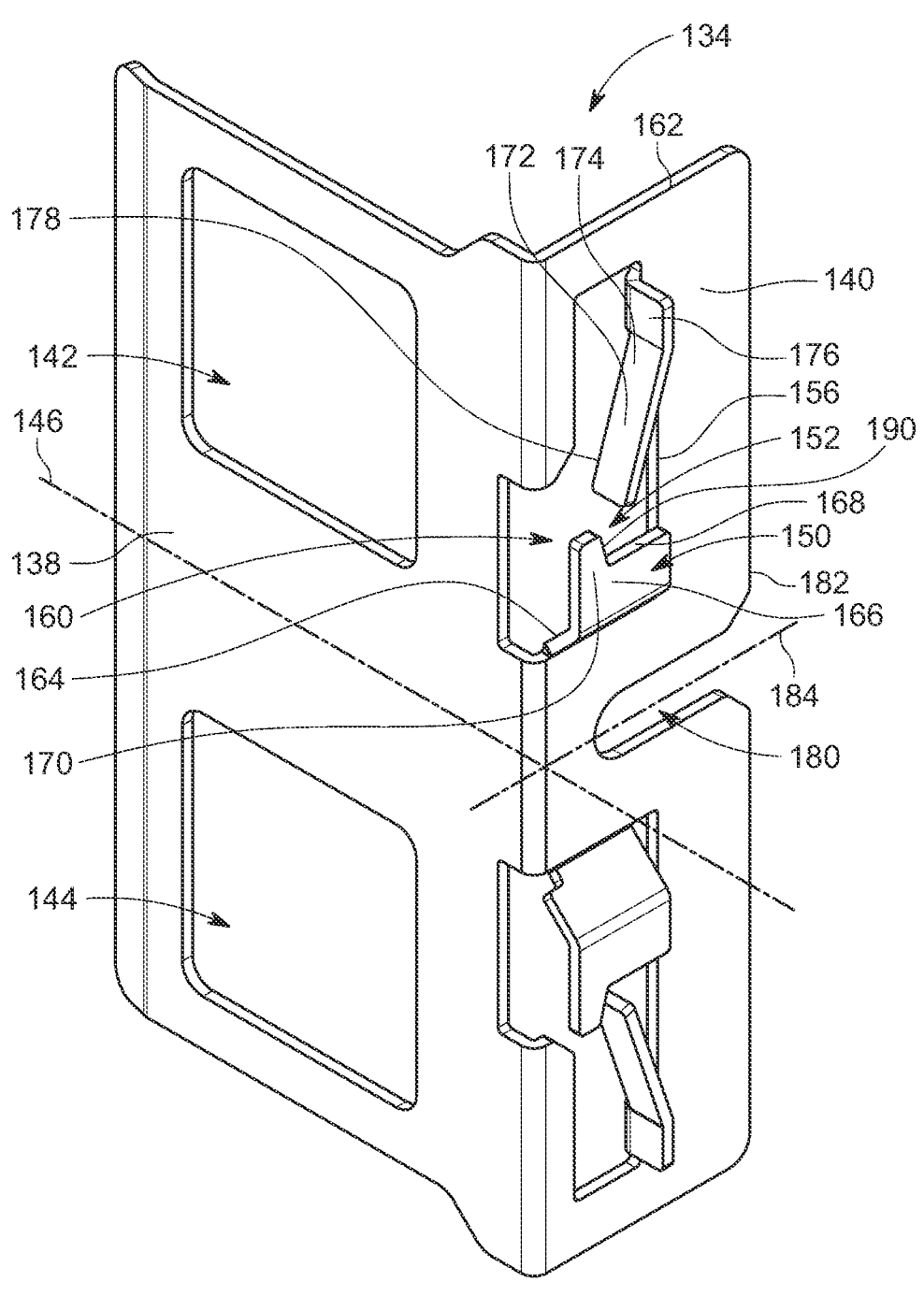
FIG. 6 is a perspective view of the bracket of FIG. 4, in accordance with an embodiment of the disclosure.

To couple/engage/attach/connect the outer panel 112 and the door 110 and at least partially cover the opening 130 of the gap 126, at either or both laterally-spaced sides of the door, the refrigeration appliance 100 includes a trim assembly 132 having one or more bracket 134 coupling the door 110 with the outer panel 112 and a trim 136 attached to the bracket(s) 134 and arranged to at least partially cover the opening 130 of the gap 126 and the brackets. Preferably, multiple brackets are spaced along the height of the door, on both sides. Preferably, both the bracket(s) and the trim are formed from metal such as steel or Aluminium and the bracket may be pressed/stamped and folded while the trim may be extruded and or machined. As best shown in FIGS. 4 to 6, the bracket 134 includes a first plate 138 and a second plate 140 extending substantially perpendicularly from a first side of the first plate 138. The first plate 138 is arranged inside the gap 126 and is coupled/attached to the inner face 120 of the outer panel 112, while the second plate 140 is attached/coupled to a side face 118 of the door 110.

As best shown in FIGS. 5 and 6, the first plate 138 defines a pair of slots or openings 142, 144 arranged symmetrically about a central lateral axis 146 of the first plate 138. The slots 142, 144 facilitate an adjustment of relative positioning of the door 110 and the outer panel 112 in a horizontal direction and/or a vertical direction in a plane substantially parallel to the outer face 114 of the door 110.

Moreover, the bracket 134 includes a clip 150 attached to the second plate 140 and extending out from the second plate 140, away from the edge face 118 of the door. In an embodiment, the second plate 140 comprises an opening 152 defining an inner laterally (i.e., substantially horizontally) extending edge 154 and an inner longitudinal (i.e., substantially vertically) extending edge 156 of the second plate 140, and the clip 150 is attached to or extends from the inner laterally extending edge 154 and extends obliquely out from or away from the opening 152, thereby defining a space 160 therebetween. As shown, the clip 150 extends towards an end, for example, upper end 162, of the second plate 140 from the inner lateral edge 154, and includes a first portion 164 extending obliquely from the second plate 140, and a second portion 166 extending from the first portion 164 to a free end 168 (FIG. 6) of the clip 150. The second portion 166 extends substantially parallel to the second plate 140, and an obtuse angle may be defined between the first portion 164 and the second portion 166, on the face of the clip 150 facing opening 152.

Additionally, the clip 150 includes a protrusion 170 that extends in a direction of the extension of the second portion 166 from the free end 168 of the second portion 166. The protrusion 170 includes a bearing surface 190 that, as will be explained in greater detail below, bears against the trim 136 in the assembly of the trim 136 with the bracket 134. Further, a width of the protrusion 170 is less than a width of the second portion 166, preferably less than half the width of second portion 166, to enable contact the trim 136 to contact both the free end 168 of the clip 150 and the bearing surface 190 simultaneously. The second plate 140 also includes a spring 172 extending towards the protrusion 170 from the inner longitudinally extending edge 156 of the second plate 140 and adapted to contact and urge the trim 136 towards the protrusion 170 to aid in correctly/consistently setting the front-to-back positioning of trim 136 with respect to the door. As shown, the spring 172 includes a plate 174 having a first end 176 attached to the inner longitudinally extending edge 156 and a second end 178 (i.e., free end 178) disposed relatively away from the inner longitudinal edge 156 and towards the protrusion 170. The second end 178 contacts or bears against the trim 136 in the assembly of the trim 136 and the bracket 134 effectively clamping a portion of the trim between bearing surface 190 and spring 172.

Further, to facilitate the attachment of the second plate 140 to the side face 118 of the door 110, the second plate 140 includes an elongated slot 180 extending from a longitudinally extending edge 182 of the second plate 140 towards the line of contact of the first and second plates. The elongated slot 180 extends in a direction substantially perpendicularly to the longitudinal edge 182 and is disposed substantially centrally of the second plate 140. Moreover, it may be appreciated that the bracket 134 is symmetrical about a central lateral axis 184 of the second plate 140, and accordingly, each bracket 134 includes two clips 150 and two springs 172. In this way, although (as will be explained below) only the upper clip and spring of any particular bracket will be used at any one time, the lower clip and spring will be used with brackets used with a trim assembly on the opposite side of the door (as the brackets used on one side are inverted with respect to the brackets on the other side).

Figure 7:
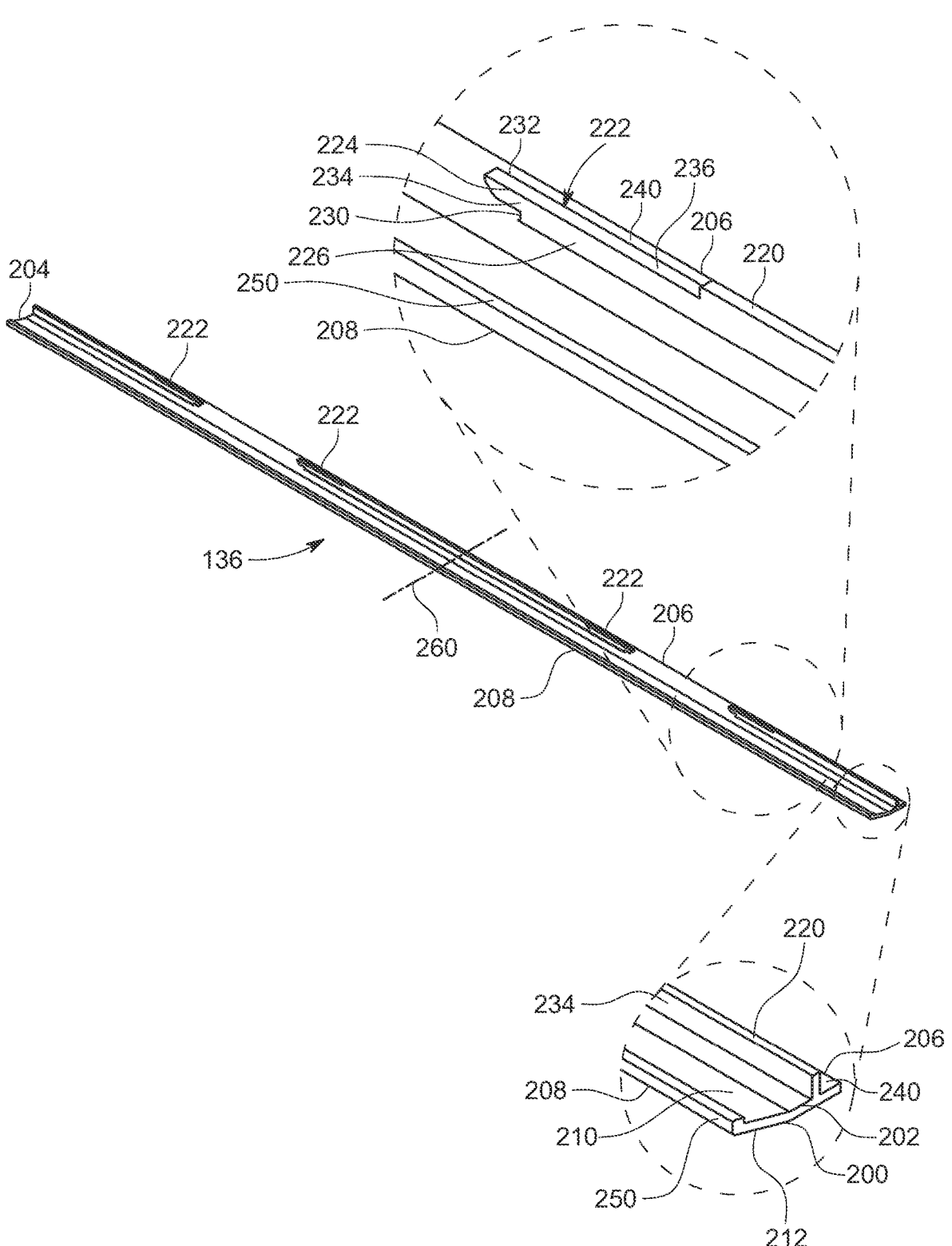
FIG. 7 is a bottom perspective view of the trim of FIG. 1, in accordance with an embodiment of the disclosure.

Referring to FIG. 7, the trim 136 includes an elongate cover structure 200 having a first end 202, a second end 204, a first longitudinal side edge 206 extending between the first end 202 and the second end 204, and a second longitudinal side edge 208 arranged opposite to the first longitudinal side edge 206 and extending between the first end 202 and the second end 204. The elongate cover structure 200 also includes a first face 210 (i.e., inner face 210) adapted to be arranged facing the door's side face 118 and the gap 126 in the assembly of the trim 136 with the door 110 and the outer panel 112, and a second face 212 (i.e., outer face 212) arranged opposite to the inner face 210.

Figure 8:
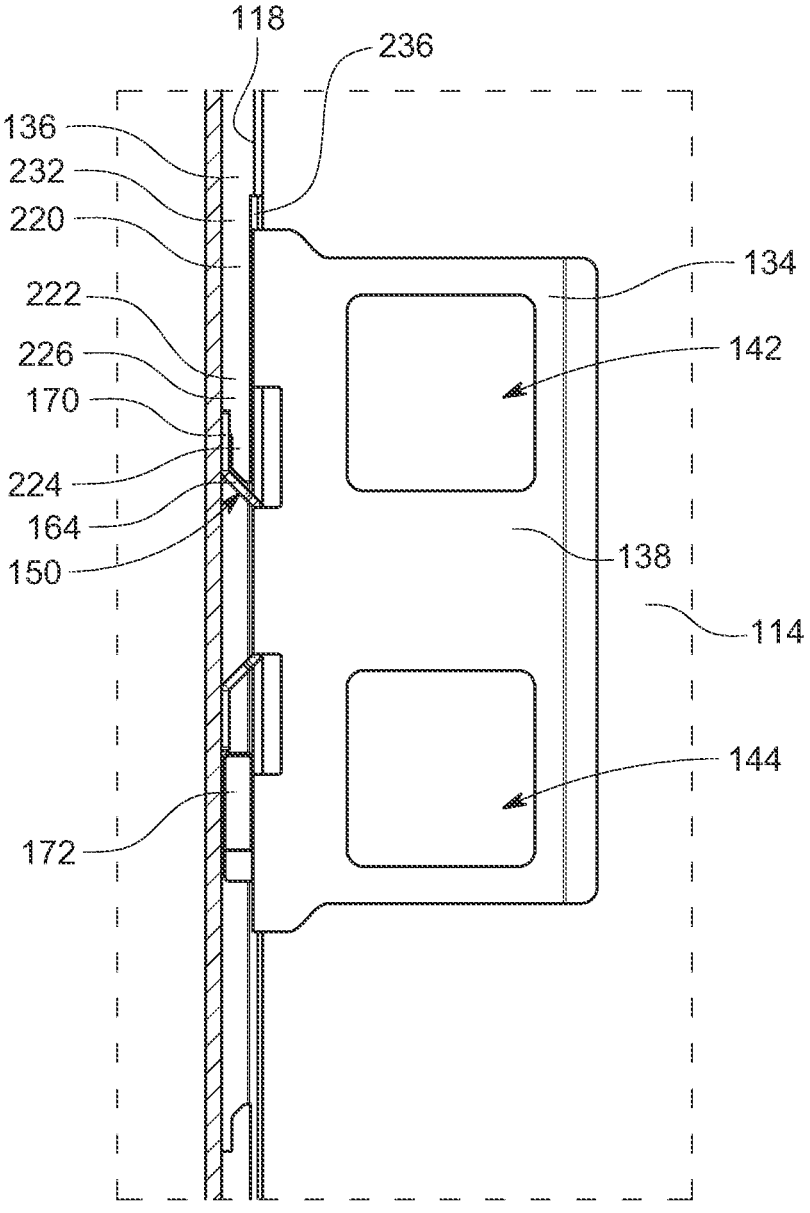
FIG. 8 is a sectional view, in a plane parallel to the front face of the refrigeration appliance of FIG. 1 with the outer panel removed, and depicting an engagement of a hook structure of the trim of FIG. 7 with a clip of the bracket of FIG. 4, in accordance with an embodiment of the disclosure.

Further, the trim 136 includes a longitudinally-extending rib 220, for example, a first rib 220, extending outwardly from the inner face 210 of the cover structure 200 and arranged between the first longitudinal side edge 206 and the second longitudinal side edge 208 of the elongate cover structure 200. The first rib 220, as shown in FIG. 7, may include intermittently-spaced cut-out portions, within each of which a bracket 134 may be accommodated. The first rib 220 defines a hook structure 222 of the trim 136, and the hook structure 222 extends from an or each end of the first rib that is adjacent a cut-out portion such that when trim 136 is oriented with its longitudinal axis substantially vertically, there are one or more downwardly-directed hook structures 222 and there may also be one or more upwardly-directed hook structures 222. As shown in FIG. 8, a hook structure 222 (in particular a downwardly-directed hook structure 222) attaches to or engages with a clip 150 (in particular, an upwardly-directed clip 150) and facilitates the coupling of the trim 136 with the bracket 134. As shown in FIG. 8, the hook structure 222 includes a first portion 224 that extends inside the space 160 defined between the clip 150 and the plane of second plate 140, and a second portion 226 that rests on the free end 168 of the clip 150 when the trim 136 is secured/engaged/assembled with the bracket 134. As shown in FIG. 7, a lower step 230 is defined between the first portion 224 and the second portion 226, and the lower step 230 contacts the free end 168 of the clip 150 while a first side surface 232 of the hook structure 222 is urged against and restrained by protrusion 170, in the engagement of the hook structure 222 with the clip 150. An upper step 236 is also formed in first rib 220, by reducing the height of the rib over a section of its length in the region of the hook structure 222. Upper step 236 provides a small gap between the door's side face 118 and first rib 220 to accommodate the thickness of second plate 140 of bracket 134.

Moreover, in the engagement of the trim 136 with bracket 134, the hook structure 222 is arranged between a protrusion 170 and its corresponding spring 172 such that a side surface 190 (i.e., bearing surface 190) of the protrusion 170 bears against the first side surface 232 of first rib 220 and hook structure 222, and the free end 178 of spring 172 bears against a second side surface 234 of the first rib 220 and hook structure 222. The second side surface 234 is arranged opposite and substantially parallel to the first side surface 232. The spring 172 is configured to urge/push the hook structure 222, and hence the trim 136, towards the protrusion 170, effectively clamping and therefore securing the trim 136 with the bracket 134.

Further, as shown in FIG. 7, the cover structure 200 includes an overhang portion 240 extending laterally from the first rib 220 to the first longitudinal side edge 206. The overhang portion 240 is adapted to at least partially cover the opening 130 of the gap 126 defined between the door 110 and the outer panel 112. Also, the trim 136 may include a second longitudinally-extending rib 250 extending from the inner face 210 of the cover structure 200 and arranged substantially parallel to the first rib 220. In an embodiment, the second rib 250 extends from the first end 202 to the second end 204 of the cover structure 200, and extends along the second longitudinal side 208 of the cover structure 200. Further, as mentioned above, the trim 136 may include an array of first ribs 220 extending linearly from the first end 202 to the second end 204, with the first ribs 220 arranged spaced apart from each other to accommodate brackets 134. Moreover, the trim 136 is symmetrical about a central lateral axis 260 so that the same trim component can be used on both lateral sides of the refrigeration appliance door. That is, trim 136 shown in FIG. 1 could be used on the hinge-side of the door by turning it upside-down, in which orientation the previously upwardly-directed hook structures 222 will now be downwardly-directed and engageable with upwardly-directed bracket clips 150.

Further, referring to FIG. 5, the trim assembly 132 includes a spacer plate 300 adapted to be arranged between the first plate 138 and the inner face 120 of the outer panel 112 and adapted to be attached to the outer panel 112. The spacer plate 300 is fastened to the outer panel 112 via suitable fasteners 302. To engage/couple the spacer plate 300 with the outer panel 112, the spacer plate 300 includes a pair of holes 304 arranged symmetrically on either side of a central lateral axis 306 of the spacer plate 300. The trim assembly 132 also includes a bridge plate 400 arranged between the first plate 138 and the outer face 114 of the door 110 and depending on the size of the gap 126, potentially abutting the outer face 114 of the door 110. The bridge plate 400 is arranged such that the first plate 138 is disposed between the bridge plate 400 and the spacer plate 300, and the bridge plate 400 is fastened/coupled to the spacer plate 300 via the fasteners 302 that extend into the outer panel 112 through holes 402 of the bridge plate 400, the slots 142, 144 of the first plate 138, and the holes 304 of the spacer plate 300. To increase friction between first plate 138 of bracket 134 and the bridge plate 400/spacer plate 300, the bridge plate 400 includes a central bend 410 that presses/bears against the first plate 138. The central bend 410 helps to clamp the bracket in a desired position to aid in positioning the outer panel during installation.

A method for assembling the trim assembly 132, the outer panel 112, and the door 110 will now be described. Note that an additional, upper bracket (not shown), may be attached to the top of the inner face 120 of the outer panel and suspended from the top edge of door 110 for supporting the majority of the outer panel's mass. Initially, a technician/installer/user engages one or more brackets 134 to the outer panel 112. Assembly of one bracket 134 with the outer panel 112 will be described but it will be appreciated that additional brackets 134 may similarly be attached/coupled to the outer panel 112. For so doing, the technician, at first, engages the first plate 138 of the bracket 134 with the inner face 120 of the outer panel 112 at a suitable location along or adjacent to a longitudinal side edge of the outer panel. To engage the first plate 138 with the outer panel 112, the technician may position the spacer plate 300 between the inner face 120 of the outer panel 112 and the first plate 138 such that the spacer plate 300 is in abutment with the inner face 120 of the outer panel 112 and the first plate 138, and the holes 304 of the spacer plate 300 are accessible through the slots 142, 144 of the first plate 138. Moreover, the bridge plate 400 is also positioned/arranged such that the first plate 138 is disposed between the bridge plate 400 and the spacer plate 300, and the holes 402 of the bridge plate 400 are aligned with the holes 304 of the spacer plate 300. Thereafter, or otherwise, the technician inserts the fasteners 302 into the outer panel 112 through the holes 402 of the bridge plate 400, the slots 142, 144 of the first plate 138, and the holes 304 of the spacer plate 300 to secure the first plate 138, the bridge plate 400, and the spacer plate 300 with the outer panel 112. In this manner, the technician engages a suitable number of brackets 134 with the outer panel 112, along or adjacent to one or both of its longitudinally-extending side edges.

Subsequently, the technician engages the bracket(s) 134, and hence fixes the location of the outer panel 112, with respect to the door 110. For so doing, the technician positions the inner face 120 of the outer panel 112 facing the outer face 114 of the door 110 such that the first plate 138 is arranged in the gap that has been formed between the door 110 and the outer panel 112. Further, the technician positions the second plate 140 abutting a side face 118 of the door 110 into which a fastener has been pre-inserted, the shaft of the fastener locating in elongated slot 180 of the bracket. Thereafter, the technician may adjust the relative positioning of the outer panel 112 and second plate 140 by moving the bracket 134 relative to the spacer plate 300 and/or the outer panel 112 in horizontal and vertical directions such that the upper surface of the outer panel 112 and the side surface of the outer panel 112 are disposed at a desired position relative to the side face 118 of the door 110 and the upper surface of the door 110, respectively, as well as surrounding or adjacent cabinetry panels. After adjusting the relative positioning of the various surfaces of the door 110 and the outer panel 112, the technician engages the second plate 140 (i.e., the bracket 134) with the door 110 by tightening the fastener located in the elongated slot 180 of the second plate 140 to the side face 118 of the door 110. In this manner, all the brackets 134 are engaged with the side face 118 of the door 110, thereby coupling or attaching the outer panel 112 to the door 110 (and, as noted above, an additional bracket at the top of the door may bear most of the panel's weight).

Figure 9:
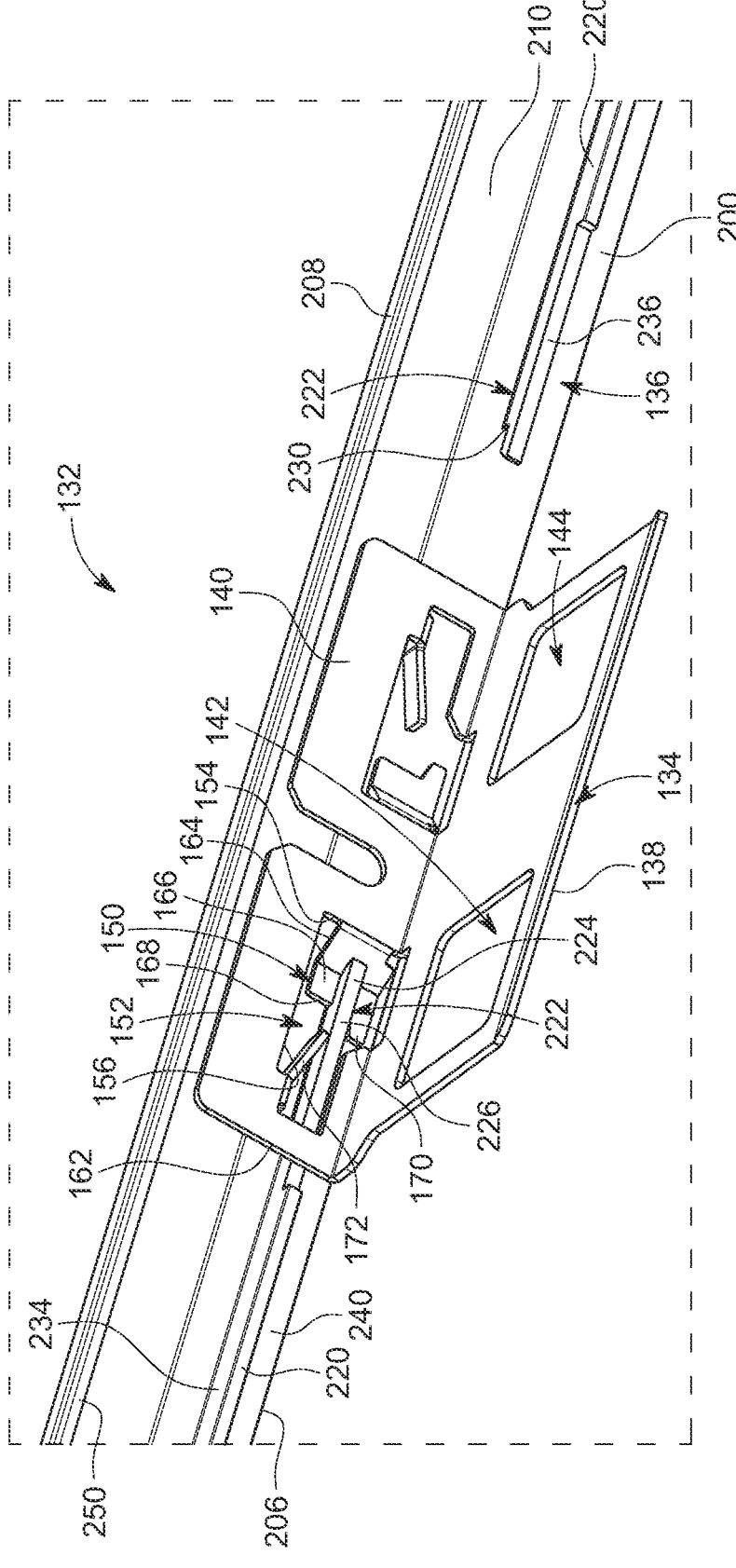
FIG. 9 is an enlarged perspective view showing the connection between the trim of FIG. 7 with the bracket of FIG. 4.

Thereafter, the technician engages one or more trims 136 with the bracket 134 to at least partially cover the opening 130 of the gap 126, on one or both side faces of the door 110. For engaging the trim 136 with the bracket 134, the technician positions the trim relative to the side surface such that the longitudinal sides 206, 208 extend along the longitudinal length (i.e., height) of the side surface of the door 110. Moreover, the trim 136 is held in position such that the second longitudinal side edge 208 of the cover structure 200 is arranged nearest to side face 118 of door 110, adjacent outer face 114, while the first longitudinal side edge 206 of the cover structure 200 is arranged adjacent to the inner face 120 of the outer panel 112. Accordingly, the overhang portion 240 is arranged covering some or all of the opening 130 of the gap 126, while the second rib 250 bears against the side face 118 of the door 110, and the cover structure 200 is arranged covering much of the side face 118 of the door 110, including bracket(s) 134. As best shown in FIG. 9, to secure the trim 136 with the bracket 134, a downwardly-directed hook structure 222 is engaged with a bracket 134 (i.e., an upwardly-directed clip 150) such that the first portion 224 extends inside the space 160, the lower step 230 abuts the free end 168 of the clip 150, and the first rib 220 is held between the spring 172 and the bearing surface 190 of protrusion 170. In this manner, the trim 136 is engaged and supported by the bracket(s) 134 only or exclusively, without relying on direct engagement with, or attachment to, the door 110 or outer panel 112 to retain it to the refrigeration appliance. Also, as the trim 136 is securely engaged/attached to the one or more brackets 134 and therefore is securely coupled (indirectly) to the door 110, disengagement of the trim 136 can be prevented.

Many modifications and other embodiments of the disclosures set forth herein will come to mind to one skilled in the art to which these disclosures pertain having the benefit of the teachings presented in the foregoing descriptions and the associated drawings. For example, the above-described trim assembly and attachment system may be applied to appliances, particularly integrated appliances, other than refrigerators, such as to doors of dishwashing machines of the conventional "drop door" variety or to the drawer of a drawer-style such as our DISHDRAWER™ dishwashers. Accordingly, the word "door" used in the description and claims should be interpreted to also include "drawer" or any other type of closure device that enables an opening in an appliance cabinet to be either opened or closed to thereby control access to a volume within the cabinet. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

The invention claimed is:

1. A trim assembly for a refrigeration appliance having a door and an outer panel coupled to the door, the trim assembly comprising:

a bracket adapted to couple the door and outer panel together, the bracket including a first plate configured to be positioned in a gap between the door and the outer panel and adapted to be coupled to the inner face of the outer panel, a second plate disposed substantially perpendicularly to the first plate and having a longitudinal length, the second plate adapted to be coupled to a side edge face of the door and to extend with its longitudinal length along a longitudinal length of the side edge face, and a clip extending out from the second plate along its longitudinal length towards a free end thereof; and a trim configured to at least partially cover an opening of the gap between the door and the outer panel, wherein the trim has a longitudinal length adapted to be aligned with the longitudinal length of the side edge face of the door and includes a hook structure extending along the trim's longitudinal length to provide a longitudinally directed opening adapted to receive the free end of the clip of the bracket via longitudinal relative motion of the clip relative to the bracket.

2. The trim assembly of claim 1, wherein the clip and the second plate define a space therebetween, wherein a first portion of the hook structure extends inside the space and a second portion of the hook structure rests on the free end of the clip in the attachment of the trim with the bracket.

3. The trim assembly of claim 2, wherein the free end of the clip includes a protrusion, wherein the protrusion is adapted to bear against a first side surface of the hook structure.

4. The trim assembly of claim 3, wherein the second plate includes a spring extending towards the protrusion and adapted to bear against a second side surface of the hook structure, opposite to the first side surface, to urge the hook structure towards the protrusion.

5. The trim assembly of claim 4, wherein the spring comprises a plate having a first end connected to the second plate and a free end arranged proximate to the protrusion of the clip, wherein the free end is adapted to bear against the second side surface of the hook structure of the trim.

6. The trim assembly of claim 1, wherein the trim includes an elongate cover structure having outer and inner faces and configured to at least partially cover the opening of the gap and having a first longitudinal side and a second longitudinal side at respective lateral edges of the outer and inner faces, and a rib extending outwardly from the inner face of the cover structure and arranged between the first and second longitudinal sides, wherein the hook structure of the trim is formed by the rib.

7. The trim assembly of claim 6, wherein the cover structure includes an overhang portion extending laterally from the first-rib to the first longitudinal side, and the overhang portion is adapted to at least partially cover the opening of the gap defined between the door and the outer panel.

8. The trim assembly of claim 1, wherein the clip is a first clip and the bracket includes a second clip, the second clip extending out from the second plate in a direction opposite to a direction of extension of the first clip.

9. The trim assembly of claim 1, wherein plural said brackets are provided for coupling the outer panel to the door, the trim including a respective hook structure for engaging with the clip of each bracket.

10. A refrigeration appliance comprising:

a door having an outer face and a side edge face arranged substantially perpendicularly to the outer face;

an outer panel having an inner face arranged facing the outer face of the door and defining a gap therebetween;

a bracket coupling the outer panel to the door and including a first plate arranged in the gap between the outer face of the door and the inner face of the outer panel and coupled to the inner face of the outer panel, a second plate disposed substantially perpendicularly to the first plate and having a longitudinal length, the second plate coupled to the side edge face of the door and extending with its longitudinal length along a longitudinal length of the side edge face, and a clip extending out from the second plate, wherein the clip extends away from the side edge face of the door along its longitudinal length towards a free end thereof; and a trim arranged at least partially covering an opening of the gap, wherein the trim has a longitudinal length aligned with the longitudinal length of the side edge face of the door and has a hook structure extending along the trim's longitudinal length to provide a longitudinally directed opening to receive the free end of the clip of the bracket via longitudinal relative motion of the clip relative to the bracket.

11. The refrigeration appliance of claim 10, wherein the clip and the second plate define a space therebetween, wherein a first portion of the hook structure extends inside the space and a second portion of the hook structure rests on the free end of the clip.

12. The refrigeration appliance of claim 11, wherein the free end of the clip includes a protrusion that bears against a first side surface of the hook structure.

13. The refrigeration appliance of claim 12, wherein the second plate includes a spring extending towards the protrusion and which bears against a second side surface of the hook structure, opposite to the first side surface, to urge the hook structure towards the protrusion.

14. The refrigeration appliance of claim 13, wherein the spring comprises a plate having a first end connected to the second plate and a free end arranged proximate to the protrusion of the clip, wherein the free end is adapted to bear against the second side surface of the hook structure of the trim.

15. The refrigeration appliance of claim 10, wherein the trim includes an elongate cover structure having outer and inner faces and configured to at least partially cover the opening of the gap and having a first longitudinal side and a second longitudinal side at respective lateral edges of the outer and inner faces, and a rib extending outwardly from the inner face of the cover structure and arranged between the first and second longitudinal sides, wherein the hook structure of the trim is formed by the rib.

16. The refrigeration appliance of claim 15, wherein the cover structure includes an overhang portion extending laterally from the first-rib to the first longitudinal side, and the overhang portion is adapted to at least partially cover the opening of the gap defined between the door and the outer panel.

17. The refrigeration appliance of claim 10, wherein the clip is a first clip and the bracket includes a second clip, the second clip extending out from the second plate, away from the side edge face of the door, in a direction opposite to a direction of extension of the first clip.

18. The refrigeration appliance of claim 10, wherein plural said brackets couple the outer panel to the door, the trim including a respective hook structure for engaging with the clip of each bracket.

19. The trim assembly of claim 1, wherein the trim includes an elongate cover structure having outer and inner faces and configured to at least partially cover the opening of the gap and having a first longitudinal side and a second longitudinal side at respective lateral edges of the outer and inner faces, wherein the first longitudinal side is adapted to be arranged adjacent to the inner face of the outer panel.

20. The refrigeration appliance of claim 10, wherein the trim includes an elongate cover structure having outer and inner faces and configured to at least partially cover the opening of the gap and having a first longitudinal side and a second longitudinal side at respective lateral edges of the outer and inner faces, wherein the first longitudinal side is arranged adjacent to the inner face of the outer panel.

*   *   *   *   *